INVENTOR
ROBERT DENES
BY Joseph W. Malleck
ATTY.

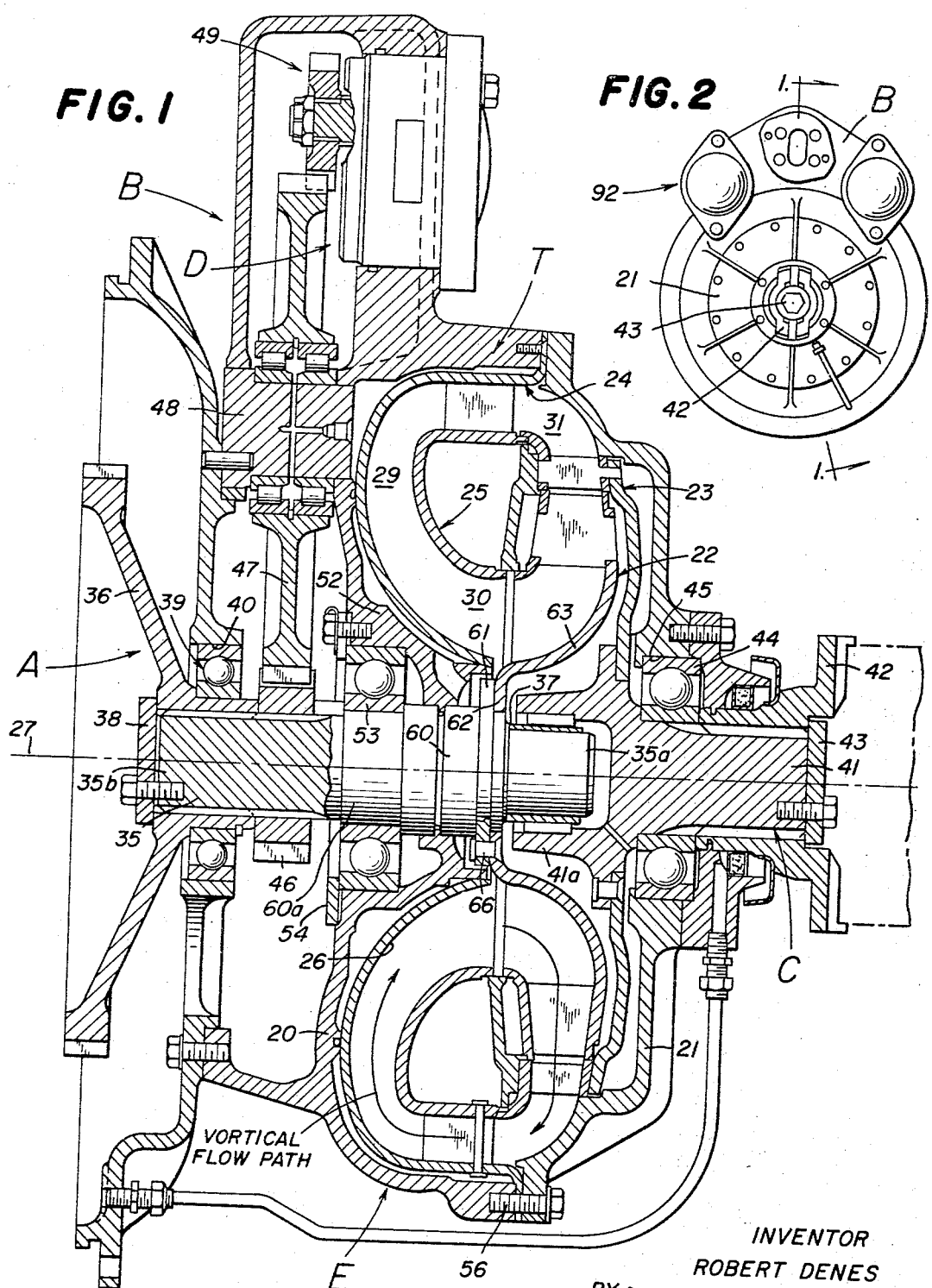

July 11, 1967 R. DENES 3,330,111
HYDROKINETIC DRIVE
Filed Sept. 10, 1965 4 Sheets-Sheet 4
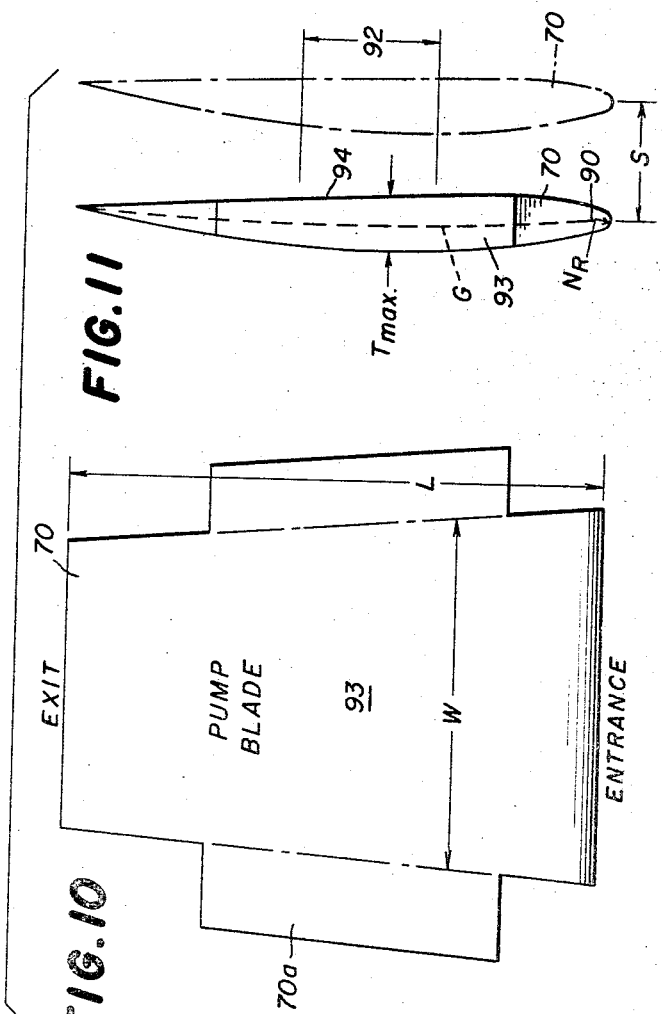
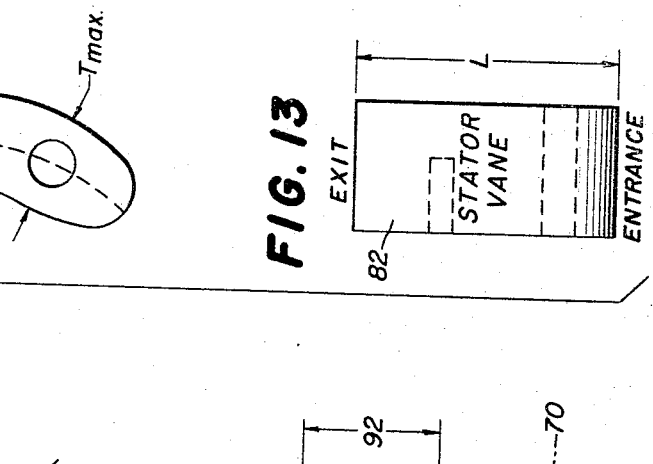
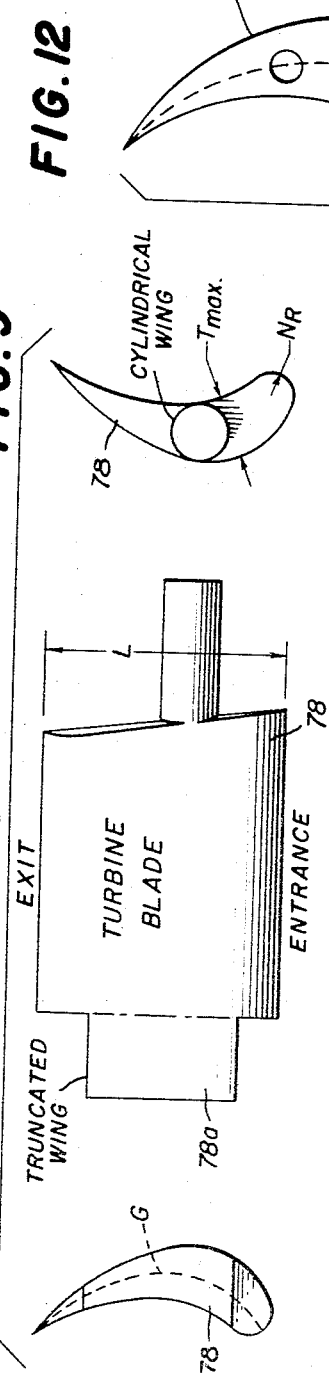
INVENTOR
ROBERT DENES
BY Joseph W. Malleck
ATTY.

United States Patent Office 3,330,111
Patented July 11, 1967

3,330,111
HYDROKINETIC DRIVE
Robert Denes, Rockford, Ill., assignor to Borg-Warner Corporation, Chicago, Ill., a corporation of Illinois
Filed Sept. 10, 1965, Ser. No. 486,267
2 Claims. (Cl. 60—54)

ABSTRACT OF THE DISCLOSURE

A transmission having a hydrokinetic uni-directional torque converter with three-bladed elements of the cast type, the impeller and turbine blades being arranged in a radial outflow (converging) channel of the toroidal chamber for circulating fluid and the stator blades being disposed in the outermost axial flow channel (substantially nonvarying) of the toroidal chamber; there is a substantially bladeless diverging channel interposed between the stator blades and the impeller blades, the latter blades being on an impulse design.

---

This invention relates to a torque converter with a single stage turbine and a stationary housing, the torque converter being generally used for heavy duty industrial and tractor power trains. This converter has uni-directional rotation with the sequence of the working elements taken with respect to the vortical flow, is pump, turbine, and stator.

The main objective of this invention is to provide the above industry with a torque converter of the above type having an improved efficiency range accompanied by an improved peak efficiency. The attainment of such object would enable the torque converter to be equally suitable to work either in series, parallel, or compound relationship with the geardrive of a transmission; such versatility has not been completely possible with prior art torque converters. A related object is to provide a torque converter having a generally constant torque absorption characteristic, i.e., the torque absorbed by the pump element from the driving motor will remain approximately constant at any given speed ratio of the torque converter within the useful range of operation. This is particularly important in industrial power trains, since the operator can utilize full engine power at any load condition without fear that the turbine load will be reflected to the pumping element.

There are certain corollaries that automatically follow from the statement of the main object and which define other operating characteristics. For example, in order to have a wider efficiency range, the efficiency both at the lower speed ratios and at the higher speed ratios must be improved. The typical efficiency curve (representing efficiency plotted against speed ratio) has a generally parabolic configuration and this improvement of the efficiency at low speed ratios automatically means that a higher stall torque ratio is necessary since stall torque ratio is the directional tangent of such curve at the origin. In other words, the steeper the directional tangent, the higher the stall torque ratio.

Structural features contemplated by this invention which result in an improved stall torque ratio, comprise a novel definition of the toroidal chamber or channels directing the fluid flow and improved blade or vane definition of the various wheeled elements to increase the rate of circulatory flow at the stall condition.

There have been relatively recent attempts in the prior art to provide single stage turbine torque converters with higher stall torque characteristics with little attention to an improved utility range. This invention contemplates improvement of the broader aspects of efficiency while at the same time improving the stall torque characteristics.

To achieve high mid-range efficiency or high peak efficiency, a reduced rate of circulatory flow is necessary while at the same time hydraulic losses in the converter must be reduced. To this end, the invention herein contemplates positioning the cascade of stator vanes, in the circulatory flow, close to the turbine blade cascade and thereby reduce the degree of flow deorganization that would take place before the fluid would be able to re-enter the stator, the latter being characteristic of the prior art; the invention also contemplates providing a relatively unrestricted or unchoked throat area through the turbine element while at the same time providing a maximum choke or restriction to the circulatory flow at the stator element (the stator being disposed in the most remote axial flow of the toroidal chamber) so that a bladeless centripetal flow section following the stator may be better utilized to accelerate the circulatory flow. Such acceleration aids in keeping the flow organized in the radial flow section of the torus. The detrimental effect of crossflow in the axially directed stator is minimized by giving greater attention to the definition of the toroidal channel walls and their cooperation with the stator vanes.

To increase efficiency at the high speed ratios requires a high race-away speed ratio for the turbine element which in turn means that the torque converter must be capable of operating in speed ratios greater than 1:1. Furthermore, the rate of circulatory flow must be maintained generally constant and at a positive value at speed ratios greater than 1:1. The use of relatively short stator blades or vanes placed closer to the turbines exit than have heretofore been contemplated, the provision of a long radial free vortex flow before the pump element entrance combined with an improved toroidal flow section through the pump and turbine elements has resulted in the attainment of increased efficiency at high speed ratios.

Other objects and advantages of this invention will become more apparent from the following detailed description taken in connection with the accompanying drawings in which:

FIGURE 1 is a central elevational and sectional view of a transmission employing a single staged turbine torque converter incorporating the principles of this invention;

FIGURE 2 is a reduced side-elevational view of the structure of FIGURE 1;

Figure 3:
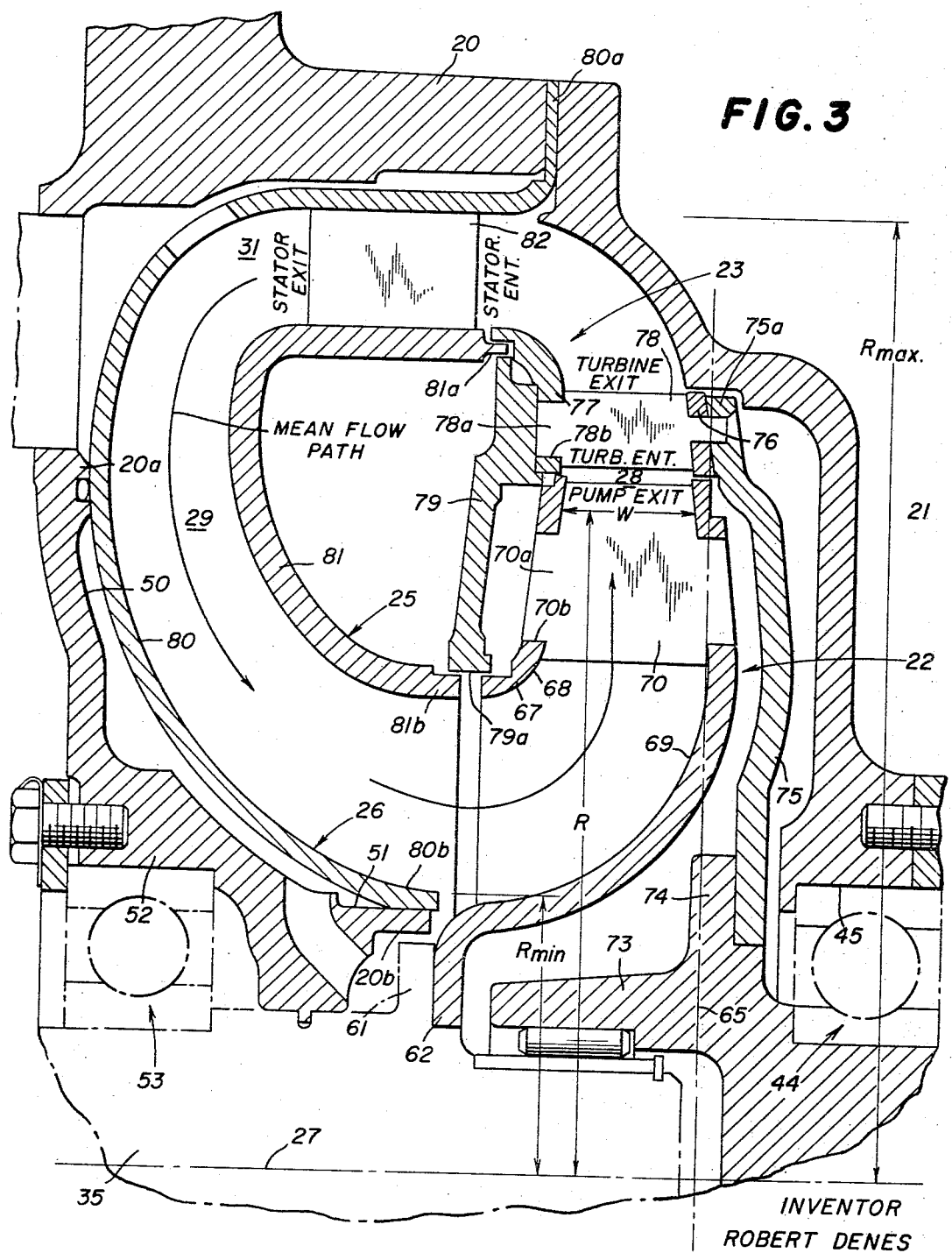
FIGURE 3 is an enlarged sectional view of one half of the torque converter.
Figure 6:
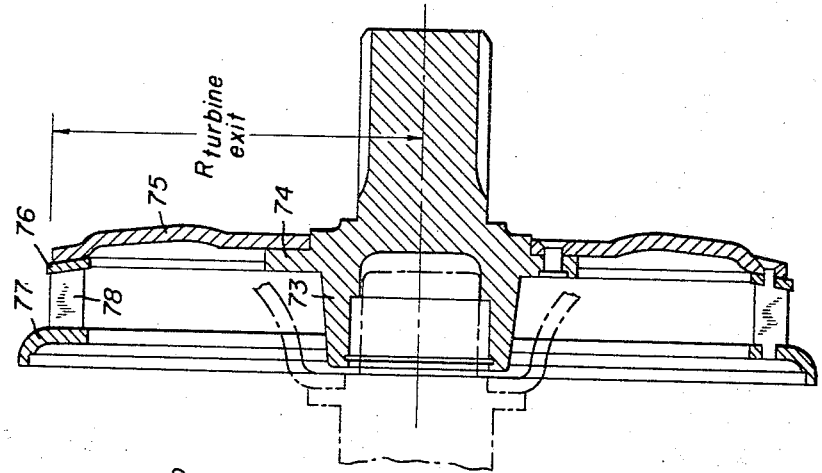
FIGURE 6 is a central sectional view of the turbine element and mounting shaft.
Figure 5:
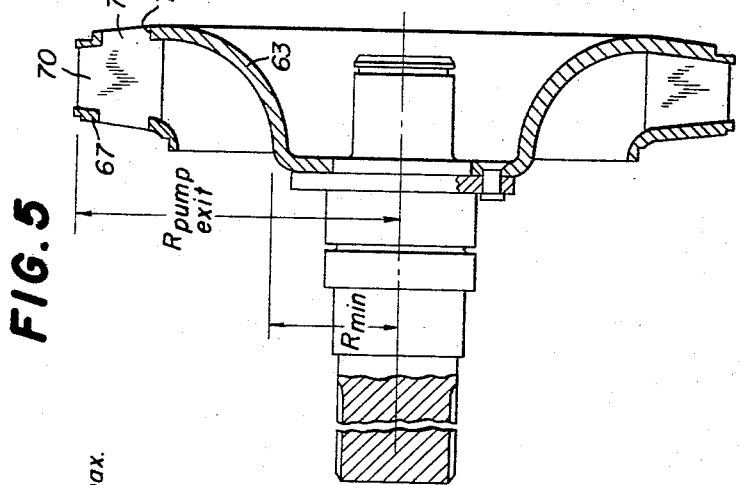
FIGURE 5 is a sectional view of the pumping element.
Figure 4:
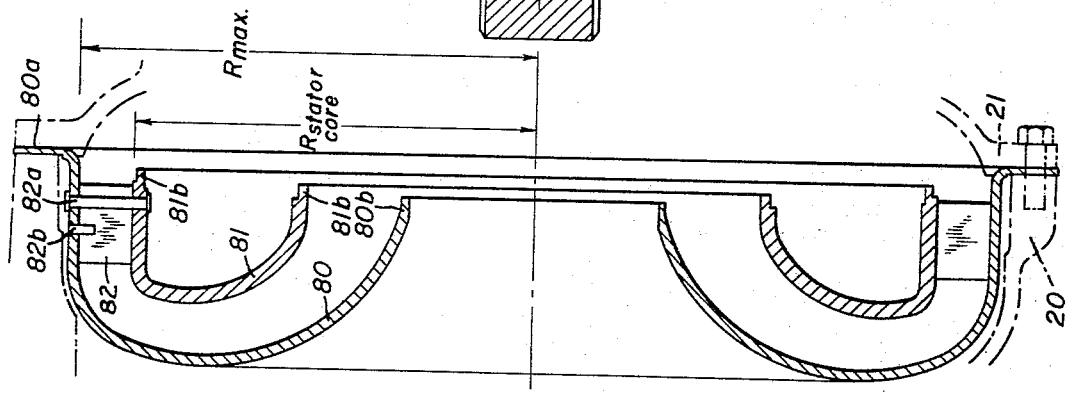
FIGURE 4 is a central sectional view of the stator element and illustrating related components in broken outline.

FIGURES 7, 9, 11, and 12, illustrate profile views of the blades for the respective turbine, pump, and stator elements; and FIGURES 8, 10, and 13 illustrate plan views of a typical blade for the respective turbine, pump, and stator elements.

Turning now to the drawings and particularly to FIGURE 2, there is illustrated a preferred embodiment of this invention wherein a portion of the overall transmission is shown incorporating a torque converter and auxiliary power take-off. It is understood that the torque converter of this invention is particularly adaptable, by features disclosed herein, to be used with mechanical transmission components either in series or compound, in addition to a parallel arrangement. Heretofore, parallel or split torque type hydraulic transmissions have been predominantly considered because the combination tends to increase the maximum overall efficiency of the transmission as a whole, as compared with the maximum efficiency developed by the torque converter component alone. This invention, by virtue of improvement of the converter characteristics per se, expands the versatility of the converter component into the other areas.

Broadly, the transmission comprises a rotatable driving input assembly A journalled in a fixed transmission housing B, and a rotatable output assembly C journalled in the torque converter housing E. A mechanical auxiliary take-off assembly D and a hydraulic torque converter T, both of which receive torque from the input assembly A.

The torque converter housing has front and rear portions 20 and 21 which substantially define a toroidal fluid chamber 26, with the pump, turbine and stator elements (22, 23 and 24) completing the chamber definition. An inner toroidal core 25 is carried by the respective elements for guiding fluid flow in the chamber. The fluid flow basically has two motion components, one a general circulation about the axis 27 of the toroidal chamber which is coincident with the axis of the input and output assemblies, and the other a vortical flow which is circulatory about the core 25; these motions combine together to provide a spiral-like flow pattern through the toroidal chamber. The discussion which follows focuses on sections of the vortical flow, wherein there is generally a radial out-flow section 28 and a generally radially inward flow section 29, each of the radial sections being connected by return bends 30 and 31 which are substantially axial taken with respect to the axis 27 of the toroidal chamber.

Turning now more particularly to the components of the transmission, the input assembly A comprises an input shaft 35 carrying a gear 36 adapted to be coupled to a prime mover (not shown), one end 35a of the input shaft has a recess 37 for journalling the forward portion of the output assembly C. The other end 35b of the input shaft carries a retainer plate 38 for positioning the input gear 36 thereon. Shaft 35 is journalled within bearing 39 received in an opening 40 of housing B.

The output assembly C has a cylindrical shaft 41 provided with a nose 41a which is rotatably journalled by the recess 37 of the input assembly and carries a yoke 42 drivingly splined thereto; the yoke is retained in axial position by a plate 43 at the rear portion thereof. Shaft 41 is rotatably journalled by a bearing 44 received in an opening 45 of the torque converter housing.

The take-off assembly D has a spur gear 46 drivingly connected with the input shaft 35 and is in mesh with an idler gear 47 carried by an idler shaft 48 supported between the front portion of the transmission housing and the front portion 20 of the torque converter housing; the idler gear 47 is in turn in mesh with one gear of a counter shaft assembly 49 which carries a take-off yoke at its opposite end.

The front portion 20 of the torque converter housing has a shell-like configuration with an internal curved surface 50 spaced from the outer sheet metal surface of the stator element nested therein; the spacing is maintained by protrusion 20a carrying a seal ring and by the radially inner and outer journals 55 and 56 for the stator element (the inner journal 55 comprises a flange 20b engaging the trailing edge 80b of the stator and journal 56 comprises a radial flange 80a fastened between the housing portions 20 and 21). An annular shoulder 52 on housing portion 20 is effective to journal bearing 53 and thereby shaft 35, a retainer plate 54 positions bearing 53 against a stepped portion of sleeve 60a of hub 60.

The pump element 22 comprises a hub 60 drivingly splined to the rear portion of the input shaft 35 and has a sleeve portion 60a interposed between the bearing assembly 53 and shaft 35; hub 60 has a radially outwardly extending flange 61 adjacent its rear portion for receiving an annular lip 62 of the gently curved wall 63 defining a portion of the toroidal fluid chamber. The wall 63 terminates in a general radial plane 65 off-set from the hub; the lip 62 and flange 61 are coupled together by suitable fasteners 66 such as rivets. The pump element has an inner or core wall 67 cooperating with the curved outer wall 63 to define internal surfaces 68 and 69 respectively (see FIGURE 3). Pump blades 70 are arranged in a circumferentially spaced manner to form a ring. The pump blades extend across the channel parallel to the axis of rotation and may be held in position by at least one pair of pins extending through the profile of the blade and into the channel walls, or each blade may have wings 70a protruding outwardly from each side for reception in complementary shaped sockets 70b in the walls 63 and 67. Each wing is a truncation of the main blade profile.

The turbine element 23 is comprised of a hub 73 carrying a radial flange 74 to which is fastened a supporting wall 75 which extends adjacent to and along the wall 63 of the pump and terminates radially outwardly thereof. The hub 73 is drivingly splined to the forward portion of the driven shaft and the outer periphery 75a of the wall lies in a plane approximately common with flange 74 of the hub. Wall 75 carries rings 76 and 77 with turbine blades 78 extending therebetween (see FIGURE 3). The ring 77 constitutes a core wall and is shaped to journal a balance plate 79 as will be further described. The blades 78 are somewhat centered over the hub and are not offset as in the case of the pump element. Each turbine blade also may have wings 78a truncated from the main blade profile and received in complementary shaped sockets 78b in rings 76 and 77 (one of the wings may have a cylindrical shape as shown in FIGURE 8).

The stator element comprises a semi-toroidal shaped outer wall 80 defining a substantial portion of the torque converter chamber 26; disposed inwardly thereof is a wall 81 complementary to the outer wall and forming a part of core 25. The outer wall has an annular flange 80a which is mounted between portions 20 and 21 of the stationary torque converter housing; the radially inner terminal portion 80b of the outer wall is journalled in recess 51 of the torque converter housing portion 20. The inner wall 81 has terminal portion 81a journalled internally within a recess of ring 76 of the turbine; terminal portion 81b is journalled internally within the central opening 79a of the balance plate 79. The walls 80 and 81 substantially define a bladeless radial inflow section 29 and a radially outer axial flow section 31 within the latter of which is disposed a plurality of circumferentially spaced stator vanes or blades 82, extending transversely across the section 31 and held in position by at least one pin 82a or rivet passing through the vanes 82 and a key 82b associating one side of the vane with wall 80.

*Channel definition*

The toroidal chamber 26 defined by the housing E and the bladed or vaned elements (22, 23, and 24) is constructed to accommodate movement of fluid therein, as stimulated by the pump element, with a spiral-like flow composed of a circulatory motion about the axis 27 of the chamber and a vortical motion about the inner circular core 25. With particular emphasis upon the vortical flow or motion, the channel, as viewed in cross section of FIGURE 3, comprises a radial outflow section 28 (radial being taken with respect to the axis 27 of the toroidal chamber), a radial inflow section 29, the radial sections being connected by smoothly curved return bend sections 30 and 31. To define the radial outflow section 28, the interior dimension W between the outer and inner walls is important since the bladed elements therein are two-dimensional and have a lateral extent which is generally parallel to the axial direction of the torque converter. The distance W gradually changes in such a way that at any radial distance R from the axis of rotation, within the generally straight-walled portion of the pumping element, the product of RW will remain generally constant; furthermore, the ratio of the square of the maximum torus radius $R_{max}$ to the sum of the above product at the entrance and exit of the pumping is substantially five. These relationships may be expressed mathematically as follows:

(1)           RW remains constant (2) $$\frac{R_{max}^2}{(RW)_{ent}+(RW)_{exit}}=5$$

At any one radial distance R from the axis of rotation within the straight walled portion of turbine element, the product of this radial distance R and the axial distance or width W between the two inner walls is substantially constant; furthermore, the ratio of the square of the maximum torus radius to the sum of the above product of the entrance and exit of the turbine element is substantially 4.6. The pumping element is located in the radial outflow section 28 close to the axis of rotation in such a way that the ratio of the fifth power of the maximum torus radius $R_{max}$ to the fifth power of the pumping element exit radius $R_{pump\ exit}$ is generally 4.8; the turbine is located in the outflow section next to the impeller but radially outwardly therefrom in such a way that the ratio of the fifth power of the turbine exit ($R_{turbine\ exit}$) to the pumping element exit radius ($R_{pump\ exit}$) is generally 1.9 or less. From the above, it can be seen that the radial outflow section has a definite convergence in a radial outward direction.

The radial inflow section 29 provides a bladeless space where the essentially free vortex flow passes through an initially converging and then diverging channel portion before it enters the radially inner return bend section 30, thus accelerating both the peripheral and radial components of the flow as well as reorganizing it.

The radial flow sections of the torus are connected by return bends where the flow is essentially axial; in order to prevent too high a peripheral flow velocity component in the bladeless axial flow section near the axis of rotation:

(A) The minimum radial distance $R_{min}$ from the torus axis is restricted in such a way that the ratio of the maximum radius $R_{max}$ of the toroidal chamber to the minimum radius $R_{min}$ thereof is substantially 3.44

(B) The ratio of the minimum radial distance $R_{min}$ of the toroidal chamber to the radius of curvature $R_{c\ min}$ of the torus wall at and near the axis of rotation is substantially 1.2 or smaller (C) The inner return bend section is bladeless, in the preferred embodiment; however, the entrance of the pumping element may have blades which partially occupy the section 30.

The stator element is located in the radially outer axial section 31 between the walls 80 and 81 which are substantially cylindrical and concentric throughout; the ratio of the fifth power of the outer wall radius $R_{max}$ to the fifth power of the inner wall radius $R_{stator\ core}$ is approximately 1.9. The straight cylindrical portion of section 31 is approximately the same length as the stator vanes or blades.

The circulatory flow within the torus of the torque converter follows a mean path (indicated by dotted lines on FIGURE 3), which is as short as possible to reduce friction losses and increase overall torque converter efficiency. For the same reason, the length of this mean path passing through the bladed portion of the torus shall be less than half of the total length of the mean path. In the preferred embodiment, the total length of the bladed portion of the mean path is less than 30% of the total length.

A specific feature of this invention is the location of the stator vane cascade with respect to the turbine cascade. The flow leaving the turbine cascade is still organized due to the effect of the turbine blades. Therefore, it is important to locate the stator vanes in the torus where flow is relatively organized, that is to place the stator blades as close to the turbine as possible. In the preferred embodiment the bladeless space between turbine and stator is kept short, and the distance between turbine and stator blades along the mean path is not more than 15% of the total length of the mean path.

The portion of torus between stator and pump element cascades is kept bladeless to reduce friction losses, and this free vortex flow section represents about 62% of the total mean path length.

Blade or vane definition

The ring of pumping blades form a cascade which is comprised of a plurality of streamlined two-dimensional blades. The pump element blades 70 each have upper and lower surfaces 93 and 94, as shown in FIGURES 10 and 11, which converge to form nose 90 (as opposed to being gently rounded) with a substantially longer length L than either the turbine blades 78 or stator vanes 82. The profile is characterized by a camber line G which has little curvature; a section 92 along the length has little variation in thickness and is the maximum thickness $T_{max}$ of the blade. The thickness ratio of the pump element blade (thickness ratio is camber line length to the maximum thickness of the blade) is approximately 10, while the nose ratio (being the maximum thickness of the blade over the nose radius Nr) is approximately 9. The pitch ratio of the pump element blade (being the ratio of the radial length L of the blade cascade to the spacing S between the blades measure at the entrance thereof) is approximately 1.1 to 1.5. For maximum utility range, the pumping element blades have an exit angle ranging between 115 degrees to 130 degrees. The entrance angle of the pumping element blade is approximately 136 degrees to 151 degrees, with an angle of flow deviation of approximately 21 degrees, the cascade of pumping blades being approximately 24 in number. The blade angles for the pump element is measured between the tangent to the mean camber line at the entrance or exit and the tangent to the edge radius passing through the respective entrance or exit.

The turbine blade cascade is comprised of approximately sixty blades 78, each being of the impulse type wherein they receive their kinetic energy primarily from the impact of the dynamic fluid flow, as opposed to the common usage of bucket type blades wherein the blades are moved by virtue of entrapment of the fluid through a rather sharp bend of the blade, much in the fashion of a windmill. The turbine blades can be characterized as streamlined and have a thickness ratio $G/T_{max}$ which is approximately 4, a nose radius ratio ($T_{max}/Nr$) approximately 3.33 and a pitch L/S of approximately 1.02. The blade contour is developed by a boundary criteria of 16 degrees at the tail-end angle.

The spacing of the turbine blades 78 which results in a specific pitch ratio $L/S$ depends upon many factors; in order to offer the minimum possible overlap of the blades for the given exit angle, a pitch ratio of 1.12 was found necessary. The entrance angle of the turbine blades is in the range of 50–55 degrees with the angle of flow deviation being approximately 107 degrees; the exit angle of the turbine blades being approximately 157–172 degrees.

The stator cascade is made up of a plurality of approximately sixty-five vanes 82, each of the stream-lined type. The stator vanes have a thickness ratio $G/T_{max}$ which is approximately 4.0, a nose radius of approximately 3.33 and a pitch ratio of 2.0 at the blade entrance. The stator vanes have an entrance angle of approximately 130–150 degrees, taken with respect to a radius thereof and provides approximately 85 degrees of flow deviation.

Throttling of the circulatory flow

A specific feature of this invention is the pinching or placement of the maximum restriction to the vortical flow at the stator element, as opposed to the restriction being at the turbine element characteristic of the prior art. The spacing of the stator vanes is such that at the maximum thickness of the blade $T_{max}$, about 57% of the total entrance flow area is obstructed by the vanes in cooperation with the adjacent diverging channel walls, thus providing a pitch ratio of 2.0 at the stator vane entrance. The throat area through this maximum restriction results in an increase in the utility ratio (which is significantly better than has heretobefore been accomplished by the prior art). In the turbine element, the pitch ratio was selected to offer the minimum possible overlapping of the blades for the given exit angle. At the maximum thickness of the profile of the turbine blades, approximately 42% of the meridional flow at the turbine entrance is obstructed, the latter being less than the maximum restriction at the stator element and thereby has a relatively open throat. At the maximum thickness of the pump element blades, approximately 21% of the meridional entrance flow is obstructed.

Another specific characteristic of this invention is the provision of aspect ratios (being the ratio of the width W of each blade or vane to its radial length L) which does not vary in a substantial manner between the pump, stator to turbine element. For example, the aspect ratio of a stator vane of the preferred embodiment, taken at the entrance is approximately 1, and taken at the exit it is approximately 1.14 (the mean respect ratio would be approximately 1.09). The turbine element has an aspect ratio of approximately 1.55 at the exit and approximately 1.72 at the entrance, with a mean aspect ratio of approximately 1.64. The impeller blades have as aspect ratio at the entrance of approximately 0.95 and a measured aspect ratio at the exit of approximately 0.71, with a resulting means aspect ratio of 0.83. Whereas, in prior art, a distinction has been drawn as to keeping the turbine blades and stator vanes of decidedly different aspect ratios, this invention contemplates maintaining the aspect ratios relatively close.

Among other factors determinative of the stall torque developed in a torque converter of the character of the type under consideration, are the forces of action and reaction resulting from the peripheral components of the velocities of flow of the working fluid entering and leaving the single stage of turbine blading. The magnitude of the force developed by these peripheral components of the flow is obviously a function of the mass of working fluid circulated per unit of time, consequently it follows that, other things being equal, an increase in the rate flow of the working fluid under stall conditions will result in an increase of the stall torque ratio developed. Accordingly, the flow circuit and the nature of disposition of blading is arranged to produce as nearly as possible the maximum rate of flow at stall for a given hydraulic head developed by the impeller. The inner return bend section and the radial inflow section are kept substantially free of blading; the blades or vanes of all the elements are maintained relatively short; the radial length of the combined blades of the turbine and the impeller is reduced: and the placement of leading edges of the turbine blades in close proximity to the trailing edges of the impeller blades and the close proximity of the stator cascade to the turbine insure the most efficient utilization of the maximum velocity of the fluid leaving the impeller blades, which velocity is not uniform across the space between the outlet edges of the adjacent impeller blades.

The high stall torque ratio obtained, coupled with the increase in the utility range is afforded by choking at the stator element and by an improved definition of the flow channels along with other attendant design factors, contribute to the formation of a novel circuit.

With the improved utility ratio, the absorption of torque by the pumping element from the engine will remain approximately constant for any given speed ratio of the torque converter.

The operation of the transmission should be largely obvious from the foregoing description.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:
1. A hydrodynamic torque converter comprising: a housing structure having a central axis, a single stage pump element rotatable about said axis and having a ring of impeller blades, a single stage turbine rotatable about said axis and comprising a ring of turbine blades of the impulse type having a streamlined profile, and a rotationally stationary stator element having a ring of guide vanes concentric with said axis, said housing structure and said element together providing a closed toroidal fluid circuit having spaced inner and outer toroidal walls concentric with said axis for circulatory working of fluid therebetween, said circuit comprising a radially extending outflow section and a radially extending inflow section with smoothly curved inner and outer bend sections connecting said outflow and inflow sections, said ring of pump blades and said ring of turbine blades being located in said outflow section with the turbine blades immediately adjacent to and radially outwardly of the pump blades, said stator having a throat area flow therethrough which provides the restriction primarily governing the rate of circulation of the working fluid resulting from any given hydraulic head developed by the pump element, and the inner and outer walls of the pump and turbine elements are defined in a radially outwardly converging channel section representing the outflow section, said section having a convergence such that at any given point therealong the product of the toroidal radius and the width of the turbine or impeller element blade will remain generally constant.

2. A hydrodynamic torque converter comprising: a housing structure having a central axis, a single stage pump element rotatable about said axis and having a ring of impeller blades, a single stage turbine rotatable about said axis and comprising a ring of turbine blades of the impulse type having a streamlined profile, and a rotationally stationary stator element having a ring of guide vanes concentric with said axis, said housing structure and said element together providing a closed torodial fluid circuit having spaced inner and outer torodial walls concentric with said axis for circulatory working of fluid therebetween, said circuit comprising a radially extending outflow section and a radially extending inflow section with smoothly curved inner and outer bend sections connecting said outflow and inflow sections, said ring of pump blades and said ring of turbine blades being located in said outflow section with the turbine blades immediately adjacent to and radially outwardly of the pump blades, said stator having a throat area flow therethrough which provides the restriction primarily governing the rate of circulation of the working fluid resulting from any given hydraulic head developed by the pump element, the radially outermost return section has an axially straight portion considerably greater than any axially directed portion of the inner return section, and said stator element being disposed in said radially outermost return section with vanes approximating the axial extend of said outermost return section, the return sections are defined so that the ratio of the maximum radius of the outer wall of the radially outermost return section of the maximum radius of the outer wall of the innermost return section is generally 3.44.

References Cited

UNITED STATES PATENTS

| | | | |
|---|---|---|---|
| 2,159,143 | 5/1939 | Fottinger | 60—54 |
| 2,166,792 | 7/1939 | Black | 60—54 X |
| 2,384,841 | 9/1945 | Lang et al. | 60—54 |

EDGAR W. GEOGHEGAN, *Primary Examiner.*